United States Patent

Winkler et al.

(10) Patent No.: US 7,864,723 B2
(45) Date of Patent: Jan. 4, 2011

(54) SYSTEM FOR SATELLITE DIGITAL COMMUNICATIONS WITH ONBOARD PROCESSING ADAPTIVE TO THE ATTENUATION TRAFFIC AND RADIO INTERFACE CONDITIONS FOR POINT TO POINT COMMUNICATION AND MESHED GRIDS

(75) Inventors: Roberto Winkler, Rome (IT); Giacinto Losquadro, Rome (IT); Rodolfo Mura, Rome (IT)

(73) Assignee: Finmeccanica SpA, Rome (IT)

( * ) Notice: Subject to any disclaimer, the term of this patent is extended or adjusted under 35 U.S.C. 154(b) by 8 days.

(21) Appl. No.: 11/721,973

(22) PCT Filed: Jun. 28, 2006

(86) PCT No.: PCT/IT2006/000498

§ 371 (c)(1),
(2), (4) Date: Aug. 27, 2009

(87) PCT Pub. No.: WO2007/000794

PCT Pub. Date: Jan. 4, 2007

(65) Prior Publication Data

US 2009/0303916 A1    Dec. 10, 2009

(30) Foreign Application Priority Data

Jun. 28, 2005  (IT)  ............... RM2005A0340

(51) Int. Cl.
*H04B 7/185* (2006.01)
*H04J 3/16* (2006.01)
*H04J 3/22* (2006.01)
(52) U.S. Cl. ................. 370/316; 370/466
(58) Field of Classification Search .............. None
See application file for complete search history.

(56) References Cited

U.S. PATENT DOCUMENTS

| 6,570,859 | B1 | 5/2003 | Cable et al. |
| 6,574,794 | B1 | 6/2003 | Sarraf |
| 2009/0161598 | A1* | 6/2009 | Dale et al. ............. 370/323 |

FOREIGN PATENT DOCUMENTS

| EP | 1 104 956 A | 6/2001 |
| IT | WO 2006/000498 A3 | 10/2006 |

* cited by examiner

*Primary Examiner* — Kevin C Harper
(74) *Attorney, Agent, or Firm* — Ladas & Parry, LLP (57) ABSTRACT

The present invention provides apparatus for processing and regenerating the signals of telecommunication satellites, for meshed communications on multi-beam coverage between standard DVB-RCS and DVB-S2 user terminals and apparatus for filtering and routing the signals transferred between ground terminals.

4 Claims, 5 Drawing Sheets

SYSTEM FOR SATELLITE DIGITAL COMMUNICATIONS WITH ONBOARD PROCESSING ADAPTIVE TO THE ATTENUATION TRAFFIC AND RADIO INTERFACE CONDITIONS FOR POINT TO POINT COMMUNICATION AND MESHED GRIDS

FIELD OF APPLICATION

The invention disclosed is intended for enabling the exchange of digital signals through satellite radio-connection between a terminal ground apparatus and one or more other remote terminals for communications in meshed configuration. The invention allows obtaining a direct connection between user terminals also of low cost, located in the satellite coverage area, for implementing satellite grids for meshed connectivity between many users. Such grids are essential for the effective and efficient supply of LAN interconnection services, remote collaborative work services, Multiparty Conferences, Voice over IP, etc.

Such grids require processors onboard of the satellite that regenerate the data transmitted to the satellite by the participants in the meshed grid and multiplex such data on a single high-capacity carrier, for example standard DVB. The invention allows obtaining two major benefits. The first benefit arises from the implementation of routing techniques onboard of sub-channels by devices that switch the digital information in the space and frequency domains; this solution allows implementing the traffic relationships required by the users. The onboard processing may be carried out by choice with and without the standard DVB-S2 and DVB-RCS signal regeneration, since the non-standard DVB configuration is implemented for terminals operating with proprietary formats of the digital data. The second benefit relates to the efficient use of the satellite interface capacity by the implementation of a suitable number of adaptive modulations and encoding both on the leading and on the trailing channel. Such formats are implemented by the ground and onboard modulators and demodulators and by the ground and onboard encoders and decoders. Such formats are defined in a centralised manner by the elements of the ground grid subsequent to signals received from the onboard processor and by the user terminals on the radio-propagation conditions on the trailing and leading channel respectively, in accordance with signals exchanged in real time between the elements of the ground grid of the satellite system and the onboard processor.

The invention can be used in applications for radio-connections with fixed or mobile stations operating via satellite. The main advantages allowed are:
1. on the trailing section to the terminal, using all the (limited) transmission power available on the satellite, as compared to the case wherein a considerable portion of such power is reserved for overcoming the effect of attenuations (especially in dark sky or rainy conditions), or alternatively it allows considerably increasing the overall band available as compared to the case wherein the power is in any case used, irrespective of the light sky conditions.
2. on the leading section to the terminal, reducing the transmission power required to the transmitting terminal, with reduction of the cost of the terminal apparatus itself, as compared to the case wherein power must be considerably oversized for overcoming the effect of radio-propagation in conditions of high probability of light sky, or alternatively, it allows reducing the overall band used with the same transmission power for transferring the information on the channel in dark sky conditions and preventing the oversizing of the channel margins for ensuring suitable and in any case high values of availability of the radio-connection.

DESCRIPTION OF THE INVENTION

The invention uses a combination of functions performed onboard of the satellite: regeneration, digital pre-processing, transparent by-pass of the regenerative processor, digital co-processing of the control signals exchanged between ground and onboard.

The onboard regeneration is performed by a demodulation stage of the digital signal (for example, standard DVB-RCS) transmitted by the ground terminal, a multiplexing stage and a modulation stage (for example, standard DVB-S2) for generating single carrier trailing signals. The access scheme used is of the Adaptive Code and Modulation (ACM) type so as to maximise the overall traffic on the band of each channel for any condition of attenuation on the connection: in other words, the system is adaptive to weather conditions. The ACM technique is envisaged both on the leading section and on the trailing section for increasing the traffic capacity in conditions of minimal atmospheric attenuation (that is, "light sky"); different modulation and encoding schemes and different "data rates" per channel are envisaged. All of this allows considerably reducing the complexity and the cost of the terminals (base band and antenna section) for a lot of signalling and traffic channels supported.

The digital pre-processing for band segmentation, routing and band re-combination for each beam of the leading section and subsequent reorganisation of such bands on one or more demodulation/re-modulation units: such pre-processing stage operates as Stage "S", that is, it allows connecting beams on the leading section with beams of the trailing section.

The transparent mode for allowing the by-pass of the regenerative processor, during the system life; this is for ensuring maximum flexibility and compatibility with terminals having unpredictable features (modulation and codes). The re-configurability therefore enables the desired mix between two extreme operating modes. The regenerative mode 1 envisages the "pre-channelling stage S"; the transparent mode 2 only envisages the by-pass pre-processing of the regenerative processor and therefore only the "pre-channelling stage S".

The digital co-processing of the signalling made onboard for routing and processing, in real time, the ground-onboard signals and the signals between control segment and traffic segment on the ground, in the multi-beam grid.

Therefore it is an object of the invention an apparatus for processing and regenerating the signals of telecommunication satellites, for meshed communications on multi-beam coverage between standard DVB-RCS and DVB-S2 user terminals, said apparatus consisting of the following parts:
  a filtering device bench (Fil);
  a trailing conversion device bench (ConvD);
  an analogue-digital conversion device bench (CAD);
  a channel demultiplexing device bench (DemC);
  a space and frequency switching device bench (ComSF);
  a signal processor controller (CPS);
  a demodulation and turbo decoding device bench (DemDec);
  a PID acknowledgement device bench (RPID);
  a modulation and formatting device bench (ModFor);
  a circular signalling bus (BCS);
  an digital-analogue conversion device bench (CAD1);
  a leading conversion device bench (ConvS)

characterised in that:
  a. a number NC of radiofrequency channels (C1, C2, C3, ...) carrying the digital signals (SD1, SD2, SD3, ...) generated by the ground terminals enter into said filtering device bench (Fil) and therein said channels are separated in band to be then converted by the trailing conversion device bench (ConvD) to the operating frequency of the channel demultiplexing device bench (DemC) that receives said channels C1, C2, C3, ... in digital format (CD1, CD2, CD3, ...) by the conversion carried out by the analogue-digital conversion device bench (CAD); said channels are then processed by the channel demultiplexing device bench (DemC) that produces the desired number Nsc of sub-channels (SC1, SC2, SC3, ...), each containing the modulated and encoded symbols that represent the information contents at the intermediate frequency of said digital signals (SD1, SD2, SD3, ...); said desired number Nsc of said incoming sub-channels (SCE1, SCE2, SCE3, ...) is determined by the bandwidth of said radiofrequency channels (C1, C2, C3, ...) and by the bandwidth of said sub-channels (SCE1, SCE2, SCE3, ...);
  b. said incoming sub-channels (SCE1, SCE2, SCE3, ...) are switched in space and frequency by said space and frequency switching device bench (ComSF), which processes the symbols belonging to said incoming sub-channels for generating as many output sub-channels (SCU1, SCU2, SCU3, ...) to the output lines of said ComSF, thus originating a re-distribution in the space and frequency of said digital signals (SD1, SD2, SD3, ...);
  c. said output sub-channels (SCU1, SCU2, SCU3, ...) are provided in input to the demodulation and turbo decoding device bench (DemDec) that processes said sub-channels applying the current demodulation profile (PADM, for example 8PSK) and the current turbo decoding profile (PADT, for example FEC 3/4) and produces the digital flows in base band (FDB1, FDB2, FDB3, ...); said PADM and PADT respectively belong to the set of demodulation profiles (PDM1, PDM2, PDM3 ...) and of turbo decoding profiles (PTD1, PTD2, PTD3, ...) obtained by said DemDec; said demodulation profiles (PDM1, PDM2, PDM3 ...) and said turbo decoding profiles (PTD1, PTD2, PTD3, ...) comply with the schemes specified by the standard DVB-RCS and form a suitable subset thereof; said PADM and PADT are defined on the basis of the strength objectives to the attenuations on the leading channel and of usage efficiency of the transmission band by said digital signals (SD1, SD2, SD3, ...); said PADM and PADT are actuated by said DemDec after a command sent by the signal processor controller (CPS);
  d. said digital flows in base band (FDB1, FDB2, FDB3, ...) are provided in input to the modulation and formatting device bench (ModFor); said ModFor generates regenerated digital flows (FDR, 1, FDR2, FDR3, ...) applying the current modulation profile (PAM, for example 8PSK) and the current turbo encoding profile (PAC, for example LDPC with FEC 3/4); said PAM and PAC respectively belong to the set of modulation profiles (PM1, PM2, PM3 ...) and of encoding profiles (PC1, PC2, PC3, ...) carried out by said ModFor; said modulation profiles (PM1, PM2, PM3 ...) and encoding profiles (PC1, PC2, PC3, ...) comply with the schemes specified by the standard DVB-RCS and form a suitable subset thereof; said PAM and PAC are defined on the basis of the strength objectives to the attenuations on the trailing channel and of usage efficiency of the transmission band by said digital signals (SD1, SD2, SD3, ...); said PAM and PAC are actuated by said ModFor after a command sent by said CPS; the number of said regenerated digital flows (FDR, 1, FDR2, FDR3, ...) is equal to the number NC of said radiofrequency channels (C1, C2, C3, ...);
  e. said regenerated digital flows (FDR, 1, FDR2, FDR3, ...) cross the digital-analogue conversion device bench (CDA1) and the leading conversion device bench (ConvS) to be then provided to the subsequent amplification sections onboard of the satellite before they are radio-transmitted on the trailing channel.

It is another object of the invention an apparatus for regenerating the signals onboard of telecommunication satellites with adaptivity of the modulation and encoding for increasing the protection of the information in conditions of poor availability of the leading (from ground terminal to satellite) and/or trailing channel (from satellite to ground terminal), said apparatus being based on the apparatus above described, characterised by the following sequence of operations:
  a. maintaining said current modulation profile (PAM) and said current turbo encoding profile (PAC) by said DemDec, in the absence of variations over the threshold of the signal to noise ratio reported by said DemDec for a time longer than the minimum deviation time (TMD);
  b. said DemDec carries out the signal measurements on the time slots of the leading channels and counts the packets discarded during the decoding following an excessive number of unrecoverable errors; the measured values are transmitted to the ground as ACM telemetries, in the format MPEG2 Private Section and are encapsulated into packets MPEG2-TS
  c. the ground control station (SCT) processes said ACM telemetries and if necessary, subsequent to changed conditions on the channel, said SCT determines the target modulation profile (POM) and the target turbo encoding profile (POC) to be actuated on the leading channel for attenuating the effects of the changed radio-propagation conditions; said SCT checks the availability of a sufficient number of time-slots available for said POM and POC on the same carrier, or checks the availability of said time-slots on other carriers on the leading channel (optionally also through reorganisation of the format into two or more leading carriers) in MF-TDMA standard DVB-RCS format:
  d. if said time-slots are available, said SCT emits the updated standard DVB-RCS SCT, TCT and FCT TBTP tables to assign to the ground terminal the necessary slots on the carrier that conveys said time-slots; if said time slots are not available, the radio-connection may undergo quality or transmission efficiency degradations;
  e. said SCT sends the remote control signal to said CPS to update the configuration of said DemDec according to said POM and POC and according to said reorganisation of the format of the leading carriers;
  f. said CPS sends the signal confirming the correct reconfiguration of said DemDec to said SCT, with signal in transport format MPEG2 private section encapsulated in packets MPEG-TS.

It is another object of the invention an apparatus for processing the signals onboard of telecommunication satellites for regenerated meshed communications on multi-beam coverage, by the combined selection and actuation of translucent onboard processing mode and regenerative onboard processing mode of satellite channels being based on the apparatus above described, further comprising the following parts:
- a channel re-multiplexing device bench (MulC);
- an digital-analogue conversion device bench (CAD2);
- a filtering and trailing channel selector bench (SCDF)

characterised in that:
- a. a number NC of radiofrequency channels (C1, C2, C3, . . . ) carrying the digital signals (SD1, SD2, SD3, . . . ) generated by the ground terminals and by the ground stations enter into said filtering device bench (Fil) and therein said channels are separated in band to be then converted as per claim 1 for producing the desired number Nsc of sub-channels (SC1, SC2, SC3, . . . ), each containing the modulated and encoded symbols that represent the information contents at the intermediate frequency of said digital signals (SD1, SD2, SD3, . . . ). Said desired number Nsc of said incoming sub-channels (SCE1, SCE2, SCE3, . . . ) is determined as per claim 1;
- b. said incoming sub-channels (SCE1, SCE2, SCE3, . . . ) are switched in space and frequency by said space and frequency switching device bench (ComSF), obtaining the output sub-channels (SCU1, SCU2, SCU3, . . . ) as per claim 1;
- c. said output sub-channels (SCU1, SCU2, SCU3, . . . ) can be provided in input alternately to said DemDec for regeneration or to the channel re-multiplexing device bench (MulC) for frequency re-combination, so as to actuate the routing configuration required by said CPS on the basis of the distribution of said incoming sub-channels (SCE1, SCE2, SCE3, . . . ) between the sub-channels to be regenerated (SCR1, SCR2, SCR3, . . . ) since associated to user terminals operating according to specific DVB-RCS and DVB-S2 and the sub-channels to be transmitted (SCT1, SCT2, SCT3, . . . ) since associated to the ground terminals not operating according to specific DVB-RCS and DVB-S2
- d. said output sub-channels (SCU1, SCU2, SCU3, . . . ) corresponding to said sub-channels to be regenerated (SCR1, SCR2, SCR3, . . . are provided in input to said DemDec and then processed as per claim 1;
- e. said output channels (SCU1, SCU2, SCU3, . . . ) corresponding to said sub-channels to be transmitted (SCT1, SCT2, SCT3, . . . ) are provided in input to said MulC; said MulC forms the processed digital flows (FDP, 1, FDP2, FDP3, . . . ) by assembling the corresponding symbols; the number of said processed digital flows (FDP, 1, FDP2, FDP3, . . . ) is equal to number NC of said radiofrequency channels (C1, C2, C3, . . . ); said processed digital flows (FDP, 1, FDP2, FDP3, . . . ) are thus equal in number and in the modulation and encoding formats of said radiofrequency channels (C1, C2, C3, . . . ).

It is another object of the invention an apparatus for filtering and routing the signals transferred between ground terminals according to the above description, characterised by the following sequence of operations:
- a. configuration by said CPS, of the PID acknowledgement device bench (RPID) with the set of the PID field values (IVPID) that said RPID must acknowledge and filter in the header of packets MPEG 2; the cardinality of said IVPID being defined based on schemes that are not a part of the invention and said IVPID being reconfigurable based on schemes that are not a part of the invention;
- b. filtering by said RPID of the 13 bits of the PID field from the header of packet MPEG-2 provided to the output of said DemDec, for each packet in output from said DemDec;
- c. calculation of the current value of said PID field (VAPID) and check of the matching between said VAPID and the values in said IVPID;
- d. in case of no matching between said VAPID and the values in said IVPID, said packet MPEG results as not carrying signalling information and is sent without any additional operation to said ModFor;
- e. in case of matching between said VAPID and the PID value corresponding to the signal exchanged in DULM mode between the user terminals and to the ground control stations, said packet MPEG must pass on said circular signalling bus (BCS) to be processed by the suitable section of said ModFor;
- f. in case of matching between said VAPID and the PID value corresponding to the remote control signal from the ground control stations to said CPS, said packet MPEG must pass on said circular signalling bus (BCS) to be processed by the signal processor that requests the actuation of the onboard processor reconfiguration remote control actuation to said DemDec;
- g. in case of matching between said VAPID and the PID value corresponding to the signal emitted by the ground control stations to the user terminals, said packet MPEG must pass on said circular signalling bus (BCS) to be processed by the suitable section of said ModFor.

DETAILED DESCRIPTION OF A PREFERRED EMBODIMENT OF THE INVENTION

The invention is described herein with reference to the embodiment presently preferred by the inventors, which is reported by way of a non-limiting example.

Figure 1:
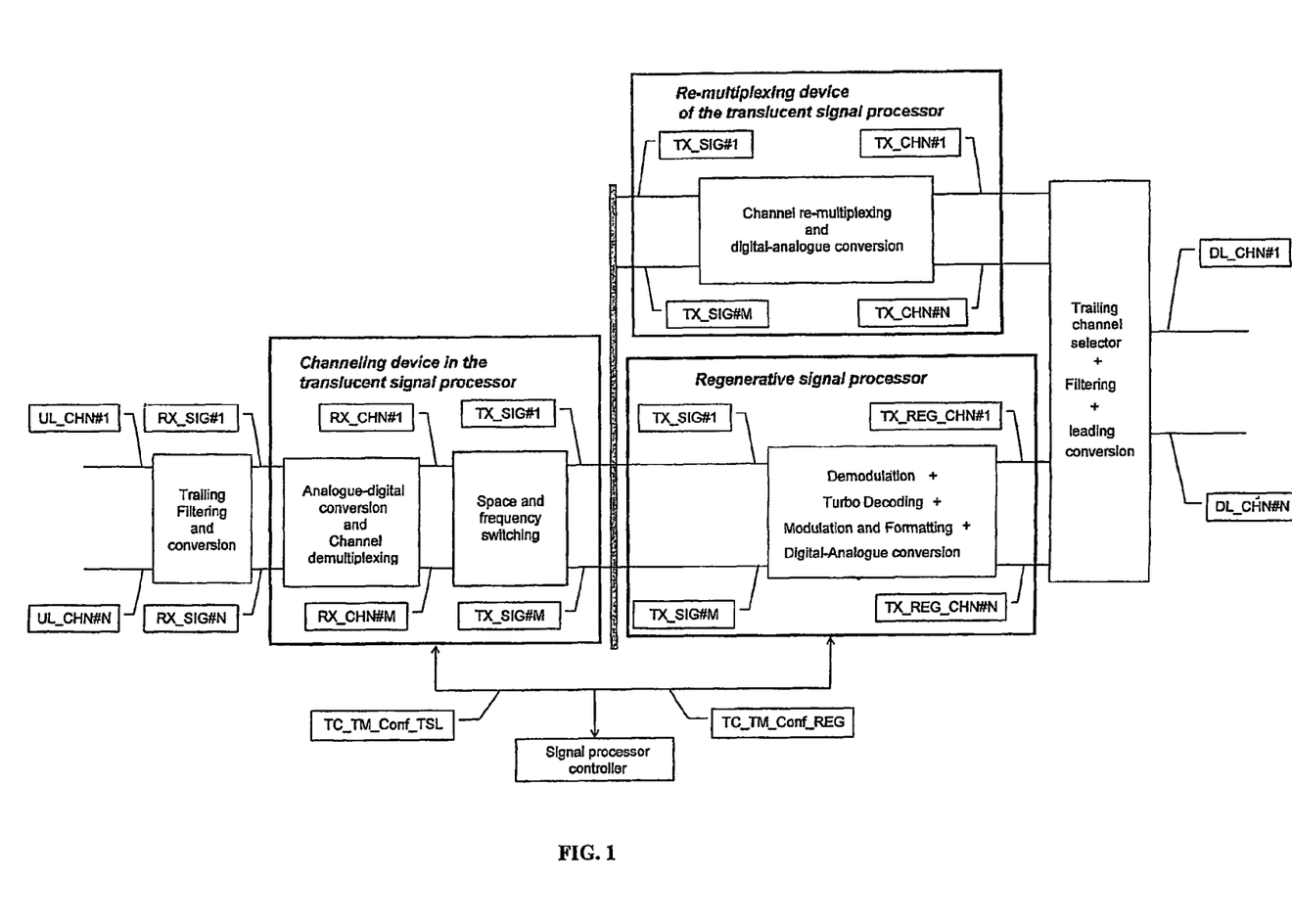
FIG. 1: Block diagram of the signal processor onboard of the satellite.

FIG. 1 shows the block diagram of the signal processor onboard of the satellite that processes up to N communication channels on which information data flows are multiplexed, transmitted by the ground transmitting terminals to the ground receiving terminals (not shown in FIG. 1) and carrying out the due space and frequency switching and processing procedures in base band for the digital signals regenerated onboard.

The system is described herein with reference to case N=9; nevertheless, the invention is compatible with a higher number of incoming signals as a result of a modular and extensible design.

With reference to FIG. 1, the system operation is described as follows:
1. The radiofrequency channels received via satellite (UL_CHN#1, up to UL_CHN#9) at the respective central frequencies (UL_CHN_FC#1, up to UL_CHN_FC#N) and having bandwidths from UL_CHN_LB#1 to UL_CHN_LB#N, are made to pass through the trailing filtering and conversion device, obtaining 9 analogue signals (from RX_SIG#1 to RX_SIG#9) in reception to the channelling device in the translucent signal processor.
2. Each of the 9 analogue signals (from RX_SIG#1 to RX_SIG#9) is in turn made to pass through the analogue-digital conversion and channel demultiplexing stage in the channelling device in the translucent signal processor, obtaining a plurality of digital flows (for example, 52) from each of the above 9 analogue signals, for a total of 468 flows (RX_CHN#1, RX_CHN#2, . . . , RX_CHN#468).
3. Each digital flow RX_CHN crosses the space and frequency switching device, obtainable by 9 switching subsystems, each capable of receiving from all of the above serial digital flows and provides in output 52 lines TX_SIG (in total TX_SIG#L up to TX_SIG 468). The space and frequency switching device re-routes the samples relating to the single bands based on the contents of a switching map defined by the ground control. The connectivity obtainable is complete, since each switching subsystem can route any one of its inputs on any one of its outputs. The architecture of the switching subsystems further allows implementing point-multipoint connections (multicast), since each block receives the samples relating to all the leading carriers.
4. The lines TX_SIG can be provided in input to the regenerative signal processor and/or to the re-multiplexing device of the translucent signal processor. The configuration of this routing of the lines TX_SIG takes place through commands sent from the ground and processed by the controller of the signal processor, which provides the actuation signals of the remote controls from the ground through signals TC_TM_Conf_TSL and TC_TM_Conf_REG, respectively from/to the regenerative signal processor and the re-multiplexing device of the translucent signal processor. A same line TX_SIG cannot be provided in input at the same time to the regenerative signal processor and to the re-multiplexing device of the translucent signal processor.
5. The lines TX_SIG provided in input to the regenerative signal processor cross the following chain of subsystems: demodulation in accordance with the rules of the standard DVB-RCS, turbo-decoding in accordance with the rules of the standard DVB-RCS, modulation and formatting in conformity with the rules of the standard DVB-S2 and digital-analogue conversion. In output to the regenerative signal processor there are up to 9 regenerated trailing channels active (from TX_REG_CHN#1 to TX_REG_CHN#9) that are thus provided to the trailing channel selector from which the channels (from DL_CHN#1 to DL_CHN#9) actually provided trailing to the user terminals are selected after the leading filtering and conversion, prior to the input to the power amplification stage (not shown in FIG. 1). The number of the above non-regenerated trailing channels TX_CHN depends on the configuration of the routing of signals TX_SIG, as described at item 4.
6. The lines TX_SIG provided in input to the re-multiplexing device of the translucent signal processor cross the channel re-multiplexing and digital-analogue conversion subsystems. In output to the re-multiplexing device of the translucent signal processor there are up to 9 non-regenerated trailing channels active (from TX_CHN#1 to TX_CHN#9) that are thus provided to the trailing channel selector from which the channels (from DL_CHN#1 to DL_CHN#9) actually provided trailing to the user terminals are selected after the leading filtering and conversion, prior to the input to the power amplification stage (not shown in FIG. 1). The number of the above non-regenerated trailing channels TX_CHN depends on the configuration of the routing of signals TX_SIG, as described at item 4.
7. The overall number of active channels provided in output from the regenerative signal processor (TX_REG_CHN) and from the re-multiplexing device of the translucent signal processor (TX_CHN) must be equal to 9; thus, the start up of signal regeneration chains within the regenerative signal processor implies the de-selection of as many signal multiplexing lines in the re-multiplexing device of the translucent signal processor.

Figure 2:
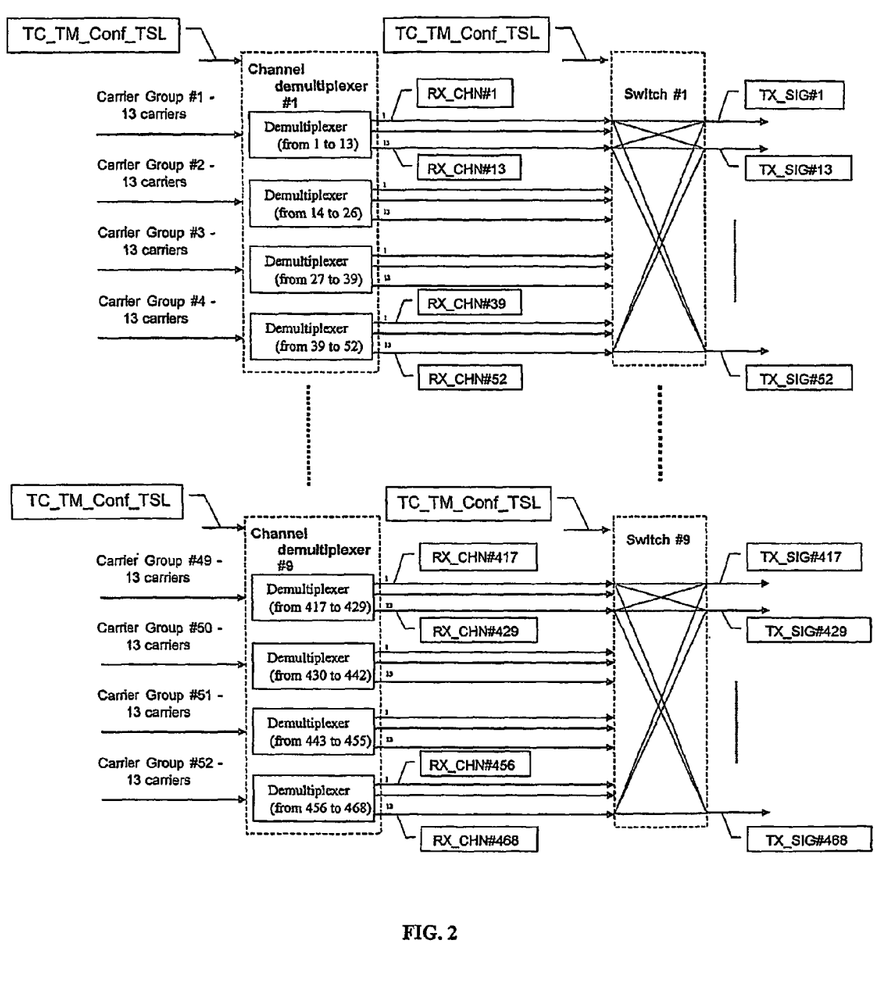
FIG. 2: One embodiment of the channelling device in the translucent signal processor.

FIG. 2 shows a possible embodiment of the subsystems of the channelling device in the translucent signal processor for channel demultiplexing and space and frequency switching. The channel de-multiplexing is organised into 9 channel demultiplexers, each comprising 4 processing chains, one for each carrier group with 13 carriers the uplink channel is divided into.

Each channel demultiplexer generates 13 serial digital flows RX_CHN, one for each carrier of the carrier group to be switched. Each serial digital flow RX_CHN consists of samples, two per symbol, of the corresponding carrier and each sample has a dimension of 32 bits.

The subsequent switching subsystem consists of 9 switches. Each switch has 468 input lines (only partly shown in FIG. 2) and therefore receives the samples relating to all the carriers allocated on the 9 leading channels; on the other end, the output lines are 52, corresponding to a trailing channel. The set of the 9 switches provides in output from the channelling device in the translucent signal processor the 468 signals TX_SIG that will be provided alternatively to the regenerative signal processor or to the re-multiplexing device of the translucent signal processor.

Figure 3:
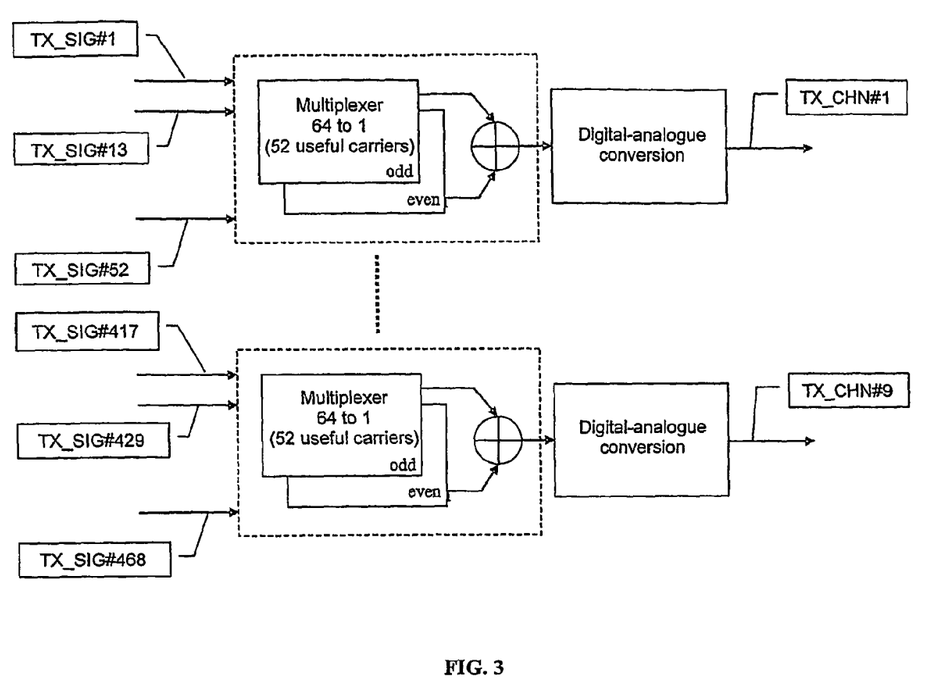
FIG. 3: One embodiment of the re-multiplexing device in the translucent signal processor.

FIG. 3 shows a possible embodiment of the re-multiplexing device in the translucent signal processor. The main subsystem of this device is multiplexer 64 to 1, which receives all the samples relating to the 52 carriers leading thereto and that will then be routed on the corresponding trailing channel. The re-multiplexing device of the translucent signal processor comprises 9 of the above multiplexers, each generating the aggregated flow associated to the 52 carriers of its carrier group, which will then be converted in analogue format prior to the subsequent processing (signal TX_CHN).

Figure 4:
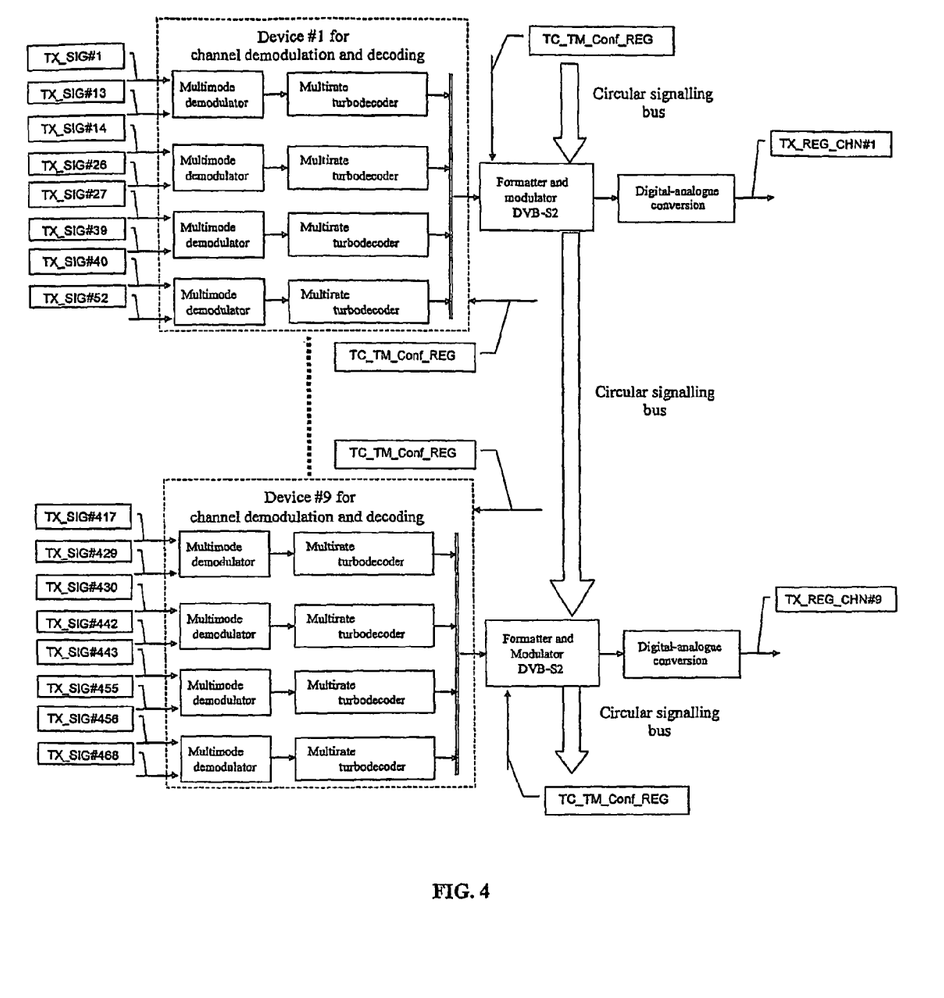
FIG. 4: One embodiment of the regenerative signal processor.

FIG. 4 shows a possible embodiment of the regenerative signal processor. The regenerative processor is provided with 9 channel decoding and demodulation devices, each one processing the 52 serial flows corresponding to the 52 frequency bands that will be routed on the associated trailing channel.

The single channel decoding and demodulation signal includes 4 processing chains (multimode demodulation+turbo decoding) that work in parallel, each on one fourth of the serial lines (TX-SIG) received in input; the result of the processing of each chain is a sequence of packets MPEG-2 TS. The information rate corresponding to the sequence of packets MPEG-2 generated by each demodulation and decoding chain depends on the modulation and on the coding rate applied to make the input frames. By way of an example, the highest information rate is obtained for a sequence of frames that are encoded and modulated for maximising the band efficiency (and the throughput) in the best conditions of radio-propagation, that is, in conditions of minimum need of strength of the encoded signal. A standard DVB-RCS frame MF-TDMA provided in output to the multimode demodulator can contain both signalling time slots and traffic time slots. The four sequences of packets MPEG-2 generated by the four processing chains are routed to the formatting and modulator device DVB-S2 that constructs a sequence of XFECFRAME using the encoding and the modulation scheme defined by the ground control.

Figure 5:
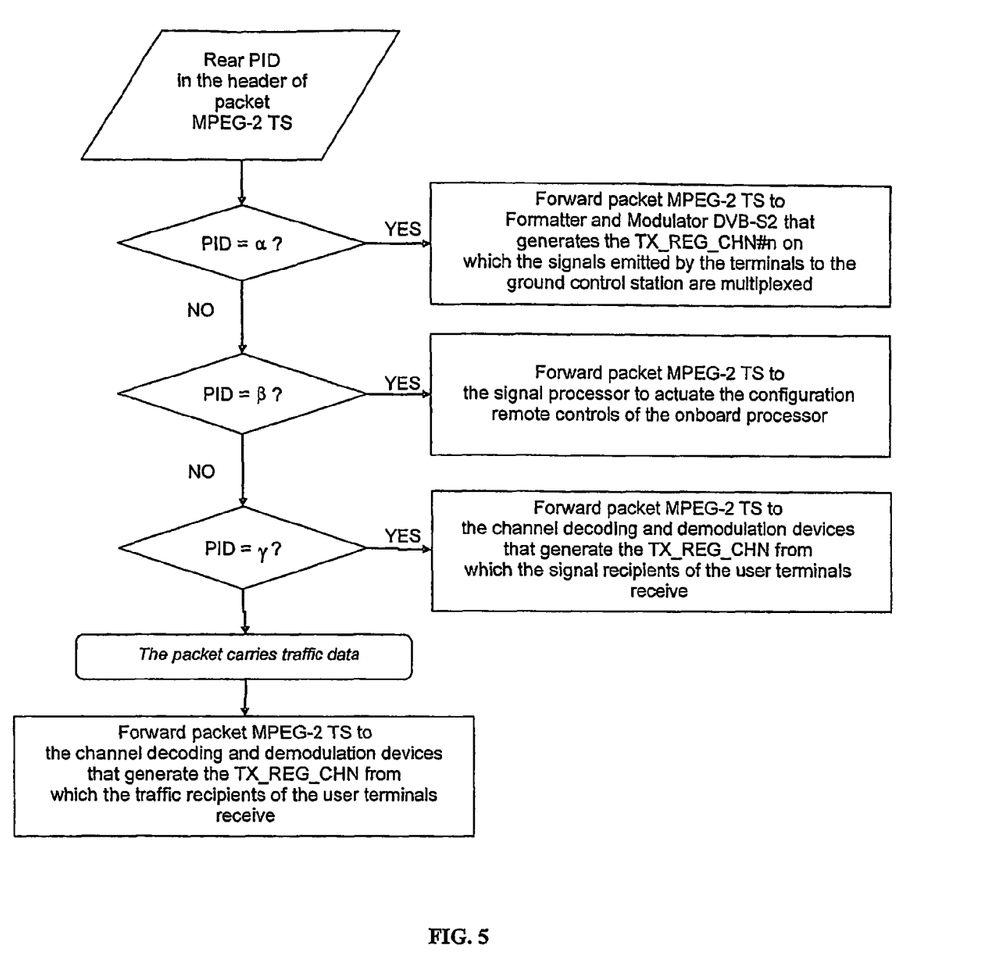
FIG. 5: Operating logic of the DVB signal co-processor.

The formatters and modulators DVB-S2 connected to the 9 channel decoding and demodulation devices are connected to each other by the circular signalling bus, also connected to the controller of the signal processor (refer to FIG. 1). All the packets MPEG-2 extracted by each channel decoding and demodulation device from their input sequences pass on this bus since they are not intended for the associated trailing channel. These packets may be of two types: (1) packets generated by the ground control station and containing the payload configuration; (2) DULM packets, that is, packets generated by the user terminals in place of the traffic packets and containing control information intended for the ground control station. The configuration packets are extracted from the circular signalling bus by the signal processor controller, which then processes them. The DULM packets are extracted from the circular signalling bus by the formatter and modulator DVB-S2 that controls the trailing channel associated to the ground control station the packet is intended for; at the same time, the formatter and modulator DVB-S2 that has extracted the DULM from its input sequences replaces the extracted packet with a dummy packet. The control logic carried out for obtaining this acknowledgement and routing of the signalling is shown in FIG. 5, wherein the values of the PID associated to the different types of signals can be configured and do not affect the specificity of the procedure.

The circular signalling bus is also used by the signal processor for routing the telemetry data relating to the onboard configuration to the ground control station; such data, in the form of packets MPEG-2, are inserted in the circular signalling bus and extracted by the formatter and modulator DVB-S2 that controls the trailing channel associated to the ground control station. This architecture performs in a distributed manner the digital co-processing of the control signals exchanged between ground and onboard.

The invention claimed is:

1. An apparatus for processing and regenerating the signals of telecommunication satellites, for meshed communications on multi-beam coverage between standard DVB-RCS and DVB-S2 user terminals, said apparatus consisting of the following parts:
   a filtering device bench (Fil);
   a trailing conversion device bench (ConvD);
   an analogue-digital conversion device bench (CAD);
   a channel demultiplexing device bench (DemC);
   a space and frequency switching device bench (ComSF);
   a signal processor controller (CPS);
   a demodulation and turbo decoding device bench (DemDec);
   a PID acknowledgement device bench (RPID);
   a modulation and formatting device bench (ModFor);
   a circular signalling bus (BCS);
   an digital-analogue conversion device bench (CAD1);
   a leading conversion device bench (ConvS)
characterised in that:
   f. a number NC of radiofrequency channels (C1, C2, C3, . . . ) carrying the digital signals (SD1, SD2, SD3, . . . ) generated by the ground terminals enter into said filtering device bench (Fil) and therein said channels are separated in band to be then converted by the trailing conversion device bench (ConvD) to the operating frequency of the channel demultiplexing device bench (DemC) that receives said channels C1, C2, C3, . . . in digital format (CD1, CD2, CD3, . . . ) by the conversion carried out by the analogue-digital conversion device bench (CAD); said channels are then processed by the channel demultiplexing device bench (DemC) that produces the desired number Nsc of sub-channels (SC1, SC2, SC3, . . . ), each containing the modulated and encoded symbols that represent the information contents at the intermediate frequency of said digital signals (SD1, SD2, SD3, . . . ); said desired number Nsc of said incoming sub-channels (SCE1, SCE2, SCE3, . . . ) is determined by the bandwidth of said radiofrequency channels (C1, C2, C3, . . . ) and by the bandwidth of said sub-channels (SCE1, SCE2, SCE3, . . . );

g. said incoming sub-channels (SCE1, SCE2, SCE3, . . . ) are switched in space and frequency by said space and frequency switching device bench (ComSF), which processes the symbols belonging to said incoming sub-channels for generating as many output sub-channels (SCU1, SCU2, SCU3, . . . ) to the output lines of said ComSF, thus originating a re-distribution in the space and frequency of said digital signals (SD1, SD2, SD3, . . . );

h. said output sub-channels (SCU1, SCU2, SCU3, . . . ) are provided in input to the demodulation and turbo decoding device bench (DemDec) that processes said sub-channels applying the current demodulation profile (PADM, for example 8PSK) and the current turbo decoding profile (PADT, for example FEC 3/4) and produces the digital flows in base band (FDB1, FDB2, FDB3, . . . ); said PADM and PADT respectively belong to the set of demodulation profiles (PDM1, PDM2, PDM3 . . . ) and of turbo decoding profiles (PTD1, PTD2, PTD3, . . . ) obtained by said DemDec; said demodulation profiles (PDM1, PDM2, PDM3 . . . ) and said turbo decoding profiles (PTD1, PTD2, PTD3, . . . ) comply with the schemes specified by the standard DVB-RCS and form a suitable subset thereof; said PADM and PADT are defined on the basis of the strength objectives to the attenuations on the leading channel and of usage efficiency of the transmission band by said digital signals (SD1, SD2, SD3, . . . ); said PADM and PADT are actuated by said DemDec after a command sent by the signal processor controller (CPS);

i. said digital flows in base band (FDB1, FDB2, FDB3, . . . ) are provided in input to the modulation and formatting device bench (ModFor); said ModFor generates regenerated digital flows (FDR, 1, FDR2, FDR3, . . . ) applying the current modulation profile (PAM, for example 8PSK) and the current turbo encoding profile (PAC, for example LDPC with FEC 3/4); said PAM and PAC respectively belong to the set of modulation profiles (PM1, PM2, PM3 . . . ) and of encoding profiles (PC1, PC2, PC3, . . . ) carried out by said ModFor; said modulation profiles (PM1, PM2, PM3 . . . ) and encoding profiles (PC1, PC2, PC3, . . . ) comply with the schemes specified by the standard DVB-RCS and form a suitable subset thereof; said PAM and PAC are defined on the basis of the strength objectives to the attenuations on the trailing channel and of usage efficiency of the transmission band by said digital signals (SD1, SD2, SD3, . . . ); said PAM and PAC are actuated by said ModFor after a command sent by said CPS; the number of said regenerated digital flows (FDR, 1, FDR2, FDR3, . . . ) is equal to the number NC of said radiofrequency channels (C1, C2, C3, . . . );

j. said regenerated digital flows (FDR, 1, FDR2, FDR3, . . . ) cross the digital-analogue conversion device bench (CDA1) and the leading conversion device bench (ConvS) to be then provided to the subsequent amplification sections onboard of the satellite before they are radio-transmitted on the trailing channel.

2. An apparatus for regenerating the signals onboard of telecommunication satellites with adaptivity of the modulation and encoding for increasing the protection of the information in conditions of poor availability of the leading (from ground terminal to satellite) and/or trailing channel (from satellite to ground terminal), said apparatus being based on the apparatus according to claim 1 characterised by the following sequence of operations:

g. maintaining said current modulation profile (PAM) and said current turbo encoding profile (PAC) by said DemDec, in the absence of variations over the threshold of the signal to noise ratio reported by said DemDec for a time longer than the minimum deviation time (TMD);

h. said DemDec carries out the signal measurements on the time slots of the leading channels and counts the packets discarded during the decoding following an excessive number of unrecoverable errors; the measured values are transmitted to the ground as ACM telemetries, in the format MPEG2 Private Section and are encapsulated into packets MPEG2-TS i. the ground control station (SCT) processes said ACM telemetries and if necessary, subsequent to changed conditions on the channel, said SCT determines the target modulation profile (POM) and the target turbo encoding profile (POC) to be actuated on the leading channel for attenuating the effects of the changed radio-propagation conditions; said SCT checks the availability of a sufficient number of time-slots available for said POM and POC on the same carrier, or checks the availability of said time-slots on other carriers on the leading channel (optionally also through reorganisation of the format into two or more leading carriers) in MF-TDMA standard DVB-RCS format:

j. if said time-slots are available, said SCT emits the updated standard DVB-RCS SCT, TCT and FCT TBTP tables to assign to the ground terminal the necessary slots on the carrier that conveys said time-slots; if said time slots are not available, the radio-connection may undergo quality or transmission efficiency degradations;

k. said SCT sends the remote control signal to said CPS to update the configuration of said DemDec according to said POM and POC and according to said reorganisation of the format of the leading carriers;

l. said CPS sends the signal confirming the correct reconfiguration of said DemDec to said SCT, with signal in transport format MPEG2 private section encapsulated in packets MPEG-TS.

3. An apparatus for processing the signals onboard of telecommunication satellites for regenerated meshed communications on multi-beam coverage, by the combined selection and actuation of translucent onboard processing mode and regenerative onboard processing mode of satellite channels, according to claim 1, further comprising the following parts:
a channel re-multiplexing device bench (MulC);
an digital-analogue conversion device bench (CAD2);
a filtering and trailing channel selector bench (SCDF) characterised in that:

f. a number NC of radiofrequency channels (C1, C2, C3, ... ) carrying the digital signals (SD1, SD2, SD3, ... ) generated by the ground terminals and by the ground stations enter into said filtering device bench (Fil) and therein said channels are separated in band to be then converted as per claim 1 for producing the desired number Nsc of sub-channels (SC1, SC2, SC3, ... ), each containing the modulated and encoded symbols that represent the information contents at the intermediate frequency of said digital signals (SD1, SD2, SD3, ... ). Said desired number Nsc of said incoming sub-channels (SCE1, SCE2, SCE3, ... ) is determined as per claim 1;

g. said incoming sub-channels (SCE1, SCE2, SCE3, ... ) are switched in space and frequency by said space and frequency switching device bench (ComSF), obtaining the output sub-channels (SCU1, SCU2, SCU3, ... ) as per claim 1;

h. said output sub-channels (SCU1, SCU2, SCU3, ... ) can be provided in input alternately to said DemDec for regeneration or to the channel re-multiplexing device bench (MulC) for frequency re-combination, so as to actuate the routing configuration required by said CPS on the basis of the distribution of said incoming sub-channels (SCE1, SCE2, SCE3, ... ) between the sub-channels to be regenerated (SCR1, SCR2, SCR3, ... ) since associated to user terminals operating according to specific DVB-RCS and DVB-S2 and the sub-channels to be transmitted (SCT1, SCT2, SCT3, ... ) since associated to the ground terminals not operating according to specific DVB-RCS and DVB-S2 i. said output sub-channels (SCU1, SCU2, SCU3, ... ) corresponding to said sub-channels to be regenerated (SCR1, SCR2, SCR3, ... ) are provided in input to said DemDec and then processed as per claim 1;

j. said output channels (SCU1, SCU2, SCU3, ... ) corresponding to said sub-channels to be transmitted (SCT1, SCT2, SCT3, ... ) are provided in input to said MulC; said MulC forms the processed digital flows (FDP, 1, FDP2, FDP3, ... ) by assembling the corresponding symbols; the number of said processed digital flows (FDP, 1, FDP2, FDP3, ... ) is equal to number NC of said radiofrequency channels (C1, C2, C3, ... ); said processed digital flows (FDP, 1, FDP2, FDP3, ... ) are thus equal in number and in the modulation and encoding formats of said radiofrequency channels (C1, C2, C3, ... ).

4. An apparatus for filtering and routing the signals transferred between ground terminals according to claim 1, characterised by the following sequence of operations:

h. configuration by said CPS, of the PID acknowledgement device bench (RPID) with the set of the PID field values (IVPID) that said RPID must acknowledge and filter in the header of packets MPEG 2; the cardinality of said IVPID being defined based on schemes that are not a part of this claim and said IVPID being reconfigurable based on schemes that are not a part of this claim;

i. filtering by said RPID of the 13 bits of the PID field from the header of packet MPEG-2 provided to the output of said DemDec, for each packet in output from said DemDec;

j. calculation of the current value of said PID field (VAPID) and check of the matching between said VAPID and the values in said IVPID;

k. in case of no matching between said VAPID and the values in said IVPID, said packet MPEG results as not carrying signalling information and is sent without any additional operation to said ModFor;

l. in case of matching between said VAPID and the PID value corresponding to the signal exchanged in DULM mode between the user terminals and to the ground control stations, said packet MPEG must pass on said circular signalling bus (BCS) to be processed by the suitable section of said ModFor, m. in case of matching between said VAPID and the PID value corresponding to the remote control signal from the ground control stations to said CPS, said packet MPEG must pass on said circular signalling bus (BCS) to be processed by the signal processor that requests the actuation of the onboard processor reconfiguration remote control actuation to said DemDec;

n. in case of matching between said VAPID and the PID value corresponding to the signal emitted by the ground control stations to the user terminals, said packet MPEG must pass on said circular signalling bus (BCS) to be processed by the suitable section of said ModFor.

* * * * *